United States Patent [19]

Dalzell

[11] Patent Number: 4,654,081

[45] Date of Patent: Mar. 31, 1987

[54] NONSMEARING CORRECTION FLUID

[75] Inventor: Rex J. Dalzell, Somerset, Wis.

[73] Assignee: Minnesota Mining and Manufacturing Company, St. Paul, Minn.

[21] Appl. No.: 627,286

[22] Filed: Jul. 2, 1984

[51] Int. Cl.⁴ .............................................. C09D 11/10
[52] U.S. Cl. ......................................... 106/23; 106/20; 106/308 M; 523/161
[58] Field of Search ....................... 106/20, 23, 308 M; 523/161

[56] References Cited

U.S. PATENT DOCUMENTS

| | | | |
|---|---|---|---|
| 2,077,874 | 4/1937 | Brower | 41/31.6 |
| 2,381,753 | 8/1945 | Irion | 106/26 |
| 3,276,870 | 10/1966 | Bitting et al. | 96/27 |
| 3,481,883 | 12/1969 | Aoyama et al. | 252/171 |
| 3,948,668 | 4/1976 | Hayek et al. | 106/22 |
| 3,997,498 | 12/1976 | Reese et al. | 260/33.8 |
| 4,165,988 | 8/1979 | Page et al. | 106/23 |
| 4,208,218 | 6/1980 | Finlayson | 106/287.3 |

OTHER PUBLICATIONS

Derwent Abstract Accession No. 83-45555k/19, Japanese Patent No. J58055939, 4/2/83.
Derwent Abstract Accession No. 83-16181k/07, Japanese Patent No. J58002363, 1/7/83.
Derwent Abstract Accession No. 82-27627e/14, Japanese Patent No. J57036173-A, 8/15/80.
Derwent Abstract Accession No. 80-59313c/34, Japanese Patent No., J55089366, 12/26/78.
Derwent Abstract Accession No. 79-28331b/15, Japanese Patent No., J54027823, 3/2/79.
Derwent Abstract Accession No. 84-309781/50, Japanese Patent No. J59193973, 11/3/84.
Derwent Abstract, Accession No. 83-830021/48, Japanese Patent No. J58180568.
Derwent Abstract, Accession No. 82-03004j/48, Japanese Patent J57170710, Oct. 21, 1982.

Primary Examiner—Amelia B. Yarbrough
Attorney, Agent, or Firm—Donald M. Sell; James A. Smith; Richard E. Brink

[57] ABSTRACT

Improved correction fluid for obscuring indicia on sheet material. Such fluid, which normally comprises a solution of pigmented thermoplastic resin, is rendered capable of obscuring typed, xerographically copied, or written ink indicia by using a solvent system having a refractive index of 1.410 or less. A preferred nonflammable system includes 20–40 volume percent 1,1,2-trichlorotrifluoroethane and correspondingly 80–60 volume percent heptane.

13 Claims, No Drawings

NONSMEARING CORRECTION FLUID

BACKGROUND OF THE INVENTION

This invention relates to correction fluids of the type used for obscuring indicia on sheet material.

During the 1950s, Mrs. Bette C. Graham developed a correction fluid to cover and obscure typing errors. Although her exact formulation was maintained secret, it was known to contain a pigmented thermoplastic polymer or resin dissolved in a volatile solvent. An error was corrected by brushing the correction fluid over it and allowing the solvent to evaporate.

Although the basic components (solvent, polymer, and opacifying pigment, especially rutile $TiO_2$) have been used in almost all correction fluids since the time of Mrs. Graham, the individual components have been varied and certain additives included to improve performance. For example, U.S. Pat. No. 3,276,870 discloses the use of such solvents as methylethylketone, methyl alcohol, benzene, ethyl acetate, and preferably toluene, and U.S. Pat. No. 4,165,988 suggests the use of a solvent mixture comprising methyl chloroform and perchloroethylene. U.S. Pat. No. 3,997,498 proposes fluorochloroethanes as solvents for resins such as poly(n-butyl methacrylate), isobutyl methacrylate:n-butyl methacrylate copolymers, poly(isobutylmethacrylate), alkyds, coumarone-indene resins, poly(styrene) resins, butadiene-styrene copolymers, and vinyl ethers. The previously mentioned U.S. Pat. No. 3,276,870 suggests as resins a polyester formed by reacting sebacic acid and glycol, the catalyzed reaction product of monomeric dienes and reactive olefins, orange shellac, cellulose acetate, vinyl chloride-vinyl acetate copolymer, styrene-butadiene copolymer, and, apparently preferably, methyl acrylate-methyl methacrylate copolymer.

The correction fluid of aforementioned U.S. Pat. No. 3,997,498 is said to be effective in obscuring not only typewritten indicia but also electrostatically reproduced indicia in which copies are based on pigmented toner resin. (It is curious that the amount of pigment present in this correction fluid is said to constitute from 15 to 35 weight percent of the solids, or perhaps somewhat less, considerably lower than in commercial correction fluids.) Notwithstanding the disclosure of this patent, manufacturers presently provide three specific types of correction fluid, one for typewritten material, one for electrostatic copies, and one for writing ink, employing a different organic or water-based solvent system for each to avoid dissolving or smearing the specific indicia to be covered.

Most correction fluids are supplied in a small bottle with an applicator brush attached to the cap. Since the opacifying pigment tends to settle out during use, glass or metal mixing beads are often included to help redisperse the pigment, the user being instructed to shake the bottle prior to application of the correction fluid. Unfortunately, thorough shaking is commonly regarded as a nuisance, so that much of the pigment remains at the bottom of the bottle. This condition is exacerbated by the fact that the solvent tends to evaporate when the bottle is open; although replacement solvent is available, it is rarely used. As a result, much of the correction fluid in each bottle is thrown away as the solids become increasingly difficult to disperse.

DISCLOSURE OF THE INVENTION

The present invention provides a correction fluid which contains a high percentage of solids, usually on the order of 40 to 70% by weight, the pigment typically constituting at least half the total weight of such solids. A preferred correction fluid employs a solvent system that is substantially more volatile than those commonly used in previous correction fluids and is particularly adapted for use in applicator pens of the type disclosed in the concurrently filed application Ser. No. 627,287, filed July 2, 1984, now U.S. Pat. No. 4,572,691, the disclosure of which is incorporated herein by reference. In a preferred embodiment of the invention, the fluid is not flammable, eliminating any need for special packaging or any requirement by the United States Department of Transportation for the use of warning labels. The preferred fluid also contains an anti-settling additive and is characterized by "soft settling", making it not only resistant to settling but also easy to redisperse.

In its most basic concept, the invention comprises an improvement to correction fluid of the traditional type, i.e., comprising solvent, thermoplastic resin dissolved in the solvent and an opacifying pigment. The improvement comprises using an organic solvent system that is liquid at 25° C. and that has a refractive index of no more than 1.410 (preferably no more than 1.400, and still more preferably no more than 1.385) at 23° C., both initially and after evaporating 90% by weight of the solvent system at 21° C. The solvent system also has low polarity and low hydrogen bonding properties. The evaporation time for a given volume of solvent system is on the order of 2 to 6 times as long as for a comparable volume of ethyl ether.

In a preferred embodiment of the invention, the solvent system comprises (1) about 20–60% (preferably 20–40%) by volume of a nonflammable fluorine-containing subsystem that is liquid at 25° C. and has a refractive index of no more than 1.385 at 23° C. and correspondingly (2) about 80–40% (preferably 80–60%) by volume of a flammable solvent subsystem having a boiling point of at least 90° C., low polarity, and low hydrogen bonding properties. The evaporation time for a given volume of nonflammable subsystem is less than that for the flammable subsystem; the time for the nonflammable subsystem should be no more than 5 times (preferably no more than twice) that for a comparable volume of ethyl ether. A presently preferred solvent system comprises a blend of 1,1,2-trichlorotrifluoroethane and heptane. In a preferred embodiment of the invention, a conventional anti-settling agent such as a bentonite gel or similar organo-clay is included.

The refractive index of a given liquid not only is closely related to its solubility parameter but also can be determined more precisely and reliably; cf. publication by George Filipovich and George V. D. Tiers, *Journal of Physical Chemistry*, Vol. 63, p. 761 (1959), footnote 4. The refractive index values mentioned in the preceding paragraphs characterize solvents that will dissolve the resin of the correction fluid but will not dissolve the resin used as the binder in the most soluble toner powder presently employed commercially in making xerographic copies. Solubility of the correction fluid resin may, of course, be enhanced by including plasticizer in the composition.

The reference to low polarity and low hydrogen bonding properties also relates to an inability of the solvent to dissolve toner powder resin and cause smearing. The polarity $E_T(30)$ should not exceed 33 when measured according to the method of Dimroth et al, *Julius Liebigs Annalen der Chemie*, Band 661, p. 1 (1963); the theoretical basis for this measurement is discussed by E. G. McRae, *J. Phys. Chem.*, Vol. 61, p. 562 (1957). Most solvents that have low polarity also have low hydrogen bonding properties; the requirement that the solvent system have low hydrogen bonding properties, however, makes doubly certain that toner resins will not be dissolved in an otherwise satisfactory solvent system.

DETAILED DESCRIPTION

The invention will now be described by reference to illustrative but non-limiting examples, in which all parts are by weight unless otherwise noted.

EXAMPLE 1

An anti-settling bentonite gel was prepared by adding 16.67 parts organo-treated bentonite powder (available from NL Chemicals/NL Industries, Inc. under the trade designation "Bentone" 14) to 78.33 parts heptane, mixing thoroughly, adding 4.7 parts methanol and 0.25 part deionized water, and continuing mixing for an additional 5 minutes. The methanol and deionized water function in combination as a polar activator, forming hydrogen bonds with the bentonite platelets, increasing the viscosity, and helping the bentonite gel to prevent settling of pigment in the ultimate correction fluid composition. "Bentone" 14 has been found especially desirable because it displays a smaller thixotropic effect when agitated than most bentonite products.

To 45.51 parts 95% purity heptane (evaporation rate 3.67) were added 3.9 parts of the bentonite gel, 19.51 parts isobutyl methacrylate polymer (commercially available from Rohm & Haas Company under the registered trademark designation "Acryloid" B-67), and 5.07 parts dioctyl phthalate plasticizer, agitating until a solution was attained. Next, 26.01 parts rutile $TiO_2$ (average particle size 0.2 micrometer, available from American Cyanamid under the trade designation "OR-560") was slowly added while mixing was continued. The composition was then ball milled for 24 hours and allowed to stand for three days. Its viscosity was found to be 185 cps (0.185 Pa.s), measured on a Brookfield LVT Viscometer at 60 rpm, spindle No. 2, after 10 revolutions. The fluid could be applied to indicia created by typewriter ribbon, ball point pen, and xerographic toner powder (based on 60:40 styrene:n-butylmethacrylate, which is especially prone to dissolve in many solvents) without smearing.

Using ASTM Test D 3278-82 for determining the flash point of liquids by Setaflash ® Closed Tester, the fluid of Example 1 was found to be flammable, a characteristic shared with at least some commercial correction fluids. Although this flammability may require warning labels to be placed on shipping containers, correction fluid is ordinarily provided in such small individual containers that the danger is minimal. The following example, however, is classified as nonflammable according to ASTM Test D 3278-82.

EXAMPLE 2

To 7.37 parts isobutyl methacrylate polymer of Example 1 was added 14.11 parts bentonite gel of Example 1, 12.18 parts 95% purity heptane, 1.89 parts dioctyl phthalate plasticizer, and 0.60 part lecithin wetting aid, and the mixture agitated until the polymer was dissolved. Next, 39.36 parts rutile $TiO_2$ of Example 1 was gradually added, after which 21.30 parts 1,1,2-trichlorotrifluoroethane (available from E. I. duPont de Nemours & Company under the registered trademark designation "Freon" 113) and 0.03 part of a carbon black-/dioctyl phthalate tinting dispersion mixed in. The resultant fluid was ball milled for 15 hours, 3.16 parts diatomaceous earth matting agent (commercially available from Johns-Manville under the registered trademark designation "Celite") added, and ball milling continued for an additional hour. The weight percentage of solids was calculated to be 54.3%, the $TiO_2$ constituting 72.4% of the solids. After the fluid had stood for three days, its viscosity was found to be 232 cps (0.232 Pa.s), measured on a Brookfield LVT Viscometer at 60 rpm, spindle No. 2, after 10 revolutions. After moderate shaking for one minute, the viscosity of the fluid was found to be 120 cps (0.120 Pa.s).

The correction fluid of this example was found to apply easily and dry within about 30 seconds at room temperature, leaving a smooth coating with excellent hiding power, flexibility and adhesion. This fluid did not smear typed originals, indicia made with most inks, or copies made with any of the toner resin classes known by applicant to be used in electrostatic copiers (polyesters, styrene/acrylate copolymers, and polyolefins).

The nonflammability of the correction fluid of Example 2 is attributable to the presence of the 1,1,2-trichlorotrifluoroethane solvent. The high density of this solvent (about 1.58, compared to about 0.68 for heptane) also helps to retard settling of the pigment in the correction fluid.

The volatility of the solvents has been found to be important. A recognized way of measuring volatility, described in *Handbook of Organic Industrial Solvents*, 5th Edition, Alliance of American Insurers, Chicago, IL, (1980), is the "evaporation rate", which is the ratio of the time required to evaporate a specified volume of a solvent to the time required to evaporate the same volume of a reference solvent. (In other words, a higher rate means a lower volatility.) The next paragraph describes a test procedure devised for performing evaporation rate measurements.

In an essentially draft-free environment at 21° C. and 50% relative humidity an accurately measured aliquot (100 $\mu$l) of the solvent is dispensed from a syringe at a uniform rate onto a 3-inch (76-mm) square of white 20-lb. bond paper (weighing about 33.8 g/m$^2$) supported by a level, horizontal ring clamp (2⅜-inch, or about 60-mm, i.d.) attached to a ring stand, thus exposing both sides of the paper to air. A circle with an area of 380 mm$^2$ (22-mm diameter) is outlined in pencil in the center of the paper square. Drops of the solvent are dispensed at a rate sufficient to maintain saturation of the paper only within the area enclosed by the circle, thus maintaining a constant surface area for evaporation. The wet area can easily be seen, as it is darker than the unwetted white paper when viewed against a dark background; the area within the circle is judged dry when the contrast totally disappears. The time required to completely evaporate all the solvent is measured with a stopwatch in three separate tests and the average time calculated. To obtain an evaporation rate for the solvent being tested, the average time is divided by the evaporation time determined for a reference solvent.

Using ethyl ether as the reference solvent, the evaporation rate of the solvent systems of Examples 1 and 2 respectively were found to be about 3.67 and 2.8. Evaporation rates in the approximate range of 2 to 6 have been found useful. Lower rates tend to cause the correction fluid to skin over when applied and to cause the ultimately dried film to have a wrinkled and irregular appearance. On the other hand, higher evaporation rates cause the fluid to dry too slowly to be acceptable to many users. For convenient brush application, the evaporation rate preferably should not exceed 4.5. For application by means of the pen referred to hereinabove, the evaporation rate preferably should not exceed 3.

It will be appreciated that numerous variations of the foregoing formulations can be made without departing from the spirit of the invention. To illustrate, wetting or dispersion aids other than lecithin can be employed, leveling agents can be included, other pigments can be substituted for or included with the $TiO_2$ (e.g., ZnO, $CaCO_3$, $BaSO^4$, etc.), ratios of solvents can be varied, one or both of the solvent subsystems may include two or more different solvents, tinting dyes or pigments can be included to match various substrates, and other anti-settling agents can be incorporated in the correction fluid.

Flammable solvents found effective in preparing correction fluids in accordance with the invention, in addition to heptane, include iso-octane, hexamethyldisiloxane, 2,2,3-trimethylpentane, 2-methylhexane, 3-methylhexane, 2-methyl-3-ethylpentane, 2,3-dimethylhexane, 2,4-dimethylhexane, 2,5-dimethylhexane, 2,3-dimethylpentane, 2,4-dimethylpentane, and 3,3-dimethylpentane. The refractive index of such flammable solvents as cyclohexane and methylcyclohexane is so high that they tend to dissolve and smear many xerographic indicia; these solvents can, however, be blended with solvents having a lower refractive index, provided that the refractive index of the blend is low enough to meet the previously specified values.

Among the nonflammable solvents found effective in preparing correction fluids in accordance with the preferred embodiments of the invention, in addition to the aforementioned 1,1,2-trichlorotrifluoroethane, are 1,1,1-trichlorotrifluoroethane, 1,1-dichlorodecafluoropentane, 1,2,2-trichloropentafluoropropane, 1-bromoperfluorohexane, 1,1-dichloroperfluorohexane, 1-chloroperfluoroheptane, 1-chloroperfluorooctane, 1-bromoperfluoroheptane, 2,3-dichlorooctafluorobutane, and 2,3-dichlorohexafluoro-2-butene.

For nonflammable solvent systems based on a blend of flammable solvent subsystems and nonflammable solvent subsystems, it is presently preferred that the flammable subsystem have a refractive index at 23° C. of no more than 1.435, and still more preferred that it not exceed 1.410. To make certain that correction fluids based on this type of solvent system will remain nonflammable as the solvent evaporates, it has been found that the boiling point of the flammable solvent subsystem should be at least 90° C. If the flammable subsystem has a significantly lower boiling point, the concentration of flammable vapors may become so high that inadvertent ignition is possible. For a correction fluid having the broadest use, solvents having the lowest refractive indexes are preferred.

As previously indicated, it is feasible to employ any resin or resins that are thermoplastic, film-forming, essentially tack-free at room temperature, and soluble in the chosen solvent system. Thus, for example, the correction fluids of the invention can, with a suitable solvent system, incorporate acrylate or methacrylate esters (e.g., "Acryloid" B-66 and B-67); polyesters [e.g., the reaction product of 5 mols sebacic acid with 4 mols 1,4-cyclohexanedimethanol and 1 mol poly(tetramethylene oxide) diol 990; the reaction product of 5 mols dimethyl sebacate and 5 mols dimethyl terephthalate with 9 mols 1,4-cyclohexane dimethanol and 1 mol poly(tetramethylene oxide) diol 990; the reaction product of 4 mols sebacic acid with 3 mols 1,4-cyclohexanedimethanol and 1 mol polypropylene glycol 400–425; the reaction product of 5 mols adipic acid with 3 mols 1,4-cyclohexanedimethanol and 2 mols poly(tetramethylene oxide) diol 990; the reaction product of 10 mols azelaic acid with 9 mols 1,5-pentanediol and 1 mol poly(tetramethylene oxide) diol 990; the reaction product of 20 mols adipic acid with 19 mols 1,4-cyclohexanedimethanol and 1 mol poly(tetramethylene oxide) diol 2000; the reaction product of cyclohexane-1,4-dicarboxylic acid and 1,6-hexanediol; and polyethylene azelate]; segmented polyesters [e.g., based on 8 mols sebacic acid, 2 mols oleic acid dimer, 1 mol poly(tetramethylene oxide) diol 990, and 9 mols 1,4-cyclohexanedimethanol; 9 mols adipic acid, 1 mol oleic acid dimer, and 10 mols 1,5-pentanediol; 4 mols adipic acid, 1 mol oleic acid dimer, and 5 mols 1,5-pentanediol; 9 mols sebacic acid, 1 mol itaconic acid, 9 mols 1,4-cyclohexanedimethanol and 1 mol poly(tetramethylene oxide) diol]; polyvinyl ethers [e.g. poly(octadecylvinyl)ether, poly(dodecylvinyl) ether, or poly(2-ethylhexyl)ether]; and polyvinyl esters.

As has been stressed throughout the foregoing disclosure, it is desirable to employ a solvent system with as low a refractive index as possible. A family of low polarity compounds noted for this characteristic are the completely fluorinated organic liquids sold by Minnesota Mining and Manufacturing Company under the registered trademark designation "Fluorinert". It has been found that certain of these liquids, the refractive indexes of which are shown in parentheses, can be used in the practice of this invention, e.g., perfluorohexane (1.251), perfluoroheptane (1.261), perfluorooctane (1.271) and blends of perfluorooctane with cyclic perfluorooctyl ether (1.271). Among the polymers soluble in these liquids are such highly fluorinated acrylates as poly 2-N-[(N-ethylperfluorooctanesulfonamido)ethyl acrylate] and poly 4-N-[(N-ethylperfluorooctanesulfonamido)butyl acrylate]. The following example shows a correction fluid incorporating an exemplary solvent and polymer of this type.

EXAMPLE 3

To 67.8 parts perfluoroheptane was added 9.6 parts poly 4-N-[(N-ethylperfluorooctanesulfonamido)butyl acrylate] and stirring continued until a solution was obtained. Using a high speed Cowles type Dispersator, 22.6 parts rutile titanium dioxide (OR-560) was dispersed in the solution. The resultant correction fluid was nonflammable, had an evaporation rate of slightly less than 3, and was totally non-smearing when applied to indicia generated by typewriter ribbons, pen inks, and all known types of xerographic toner powders.

I claim:

1. Correction fluid capable of obscuring indica made by typewriter ribbons, writing inks, and fused toner powders, all without either dissolving or smearing said indicia, comprising in combination:

a. a solvent system that is liquid at 25° C. and that has (1) refractive index of 1.410 or less, both initially and after the evaporation of 90 percent by weight of said solvent system,
(2) low polarity, the $E_T(30)$ not exceeding 33,
(3) low hydrogen bonding, and
(4) an evaporation rate such that the time for evaporation of a given volume is in the approximate range of 2 to 6 times that for a comparable volume of ethyl ether, b. thermoplastic resin dissolved in said solvent system, and
c. opacifying pigment.

2. The correction fluid of claim 1 wherein the solvent system has a refractive index of 1.400 or less at 23° C.

3. The correction fluid of claim 1 wherein the solvent system has a refractive index of 1.385 or less at 23° C.

4. The correction fluid of claim 1 wherein the solvent system is nonflammable and consists essentially of
a. about 20–60% by volume of nonflammable fluorine-containing subsystem that is liquid at 25° C. and has a refractive index of no more than 1.385 at 23° C., and, correspondingly,
b. about 80–40% by volume of a flammable solvent subsystem that has low polarity, low hydrogen bonding properties, and a boiling point of at least 90° C., the evaporation time for a given volume of said nonflammable solvent subsystem being less than that for the same volume of flammable solvent subsystem and no more than about 6 times as great as for the same volume of ethyl ether.

5. The correction fluid of claim 4 wherein the flammable solvent subsystem consists essentially of aliphatic hydrocarbon.

6. The correction fluid of claim 4 wherein 100 parts of the correction fluid contains, on a weight basis,
a. 30–50 parts solvent system and correspondingly
b. 70–50 parts solids, the individual components of said solids comprising about 10–15% isobutyl methacrylate polymer, 2–5% dioctyl phthalate plasticizer, 50–70% titanium dioxide, 20–25% bentonite gel, and 0.5–2% lecithin.

7. The correction fluid of claim 4 wherein an anti-settling agent is included.

8. The correction fluid of claim 7 wherein the anti-settling agent comprises an organo-clay.

9. The correction fluid of claim 7 wherein the anti-settling agent is a bentonite gel.

10. In a correction fluid for obscuring indicia applied to sheet material, said fluid comprising solvent, thermoplastic resin dissolved in the solvent, and an opacifying pigment,
the improvement comprising using as the solvent a nonflammable solvent system comprising about 20–40% by volume of 1,1,2-trichlorotrifluoroethane and correspondingly about 80–60% by volume of flammable aliphatic solvent,
whereby the correction fluid is capable of obscuring indicia made by typewriter ribbons, writing inks, and fused toner powders, all without dissolving or smearing said indicia.

11. Correction fluid capable of obscuring indicia made by typewriter ribbons, writing inks, and fused toner powders, all without either dissolving or smearing said indicia, comprising in combination:
a. a nonflammable solvent system consisting essentially of, on a volume basis,
(1) about 25–35% 1,1,2-trichlorotrifluoroethane and, correspondingly,
(2) about 75–65% heptane
b. a thermoplastic acrylate or methacrylate resin dissolved in the solvent system,
c. a plasticizer for said resin,
d. an effective amount of finely divided rutile titanium dioxide as an opacifying pigment,
e. a bentonite gel as an anti-settling agent, and
f. a wetting agent,
said correction fluid resisting settling and being readily redispersed, even after extended standing.

12. The correction fluid of claim 1 wherein the solvent system is a completely fluorinated organic liquid.

13. Correction fluid capable of obscuring indicia made by typewriter ribbons, writing inks, and fused toner powders, all without either dissolving or smearing said indicia, consisting essentially of:
a. a solvent system that is liquid at 25° C. and that has
(1) a refractive index of 1.410 or less, both initially and after the evaporation of 90 percent by weight of said solvent system,
(2) low polarity, the $E_T(3)$ not exceeding 33,
(3) low hydrogen bonding, and
(4) an evaporation rate such that the time for evaporation of a given volume is in the approximate range of 2 to 6 times that for a comparable volume of ethyl ether,
b. thermoplastic resin dissolved in said solvent system, and
c. opacifying pigment.

* * * * *